United States Patent [19]

Kinsman

[11] 4,098,965
[45] Jul. 4, 1978

[54] FLAT BATTERIES AND METHOD OF MAKING THE SAME

[75] Inventor: Gordon F. Kinsman, Billerica, Mass.

[73] Assignee: Polaroid Corporation, Cambridge, Mass.

[21] Appl. No.: 809,976

[22] Filed: Jun. 27, 1977

Related U.S. Application Data

[62] Division of Ser. No. 761,652, Jan. 24, 1977, abandoned.

[51] Int. Cl.² ............................................. H01M 6/46
[52] U.S. Cl. .................................... 429/153; 429/162
[58] Field of Search ............................... 429/151–155, 429/162, 149, 210

[56] References Cited

U.S. PATENT DOCUMENTS

| | | | |
|---|---|---|---|
| 2,521,800 | 9/1950 | Martinez et al. | 429/155 |
| 2,843,649 | 7/1958 | Louis | 429/154 |
| 3,563,805 | 2/1971 | Deierhoi, Jr. | 429/152 |
| 3,674,565 | 7/1972 | Bergum et al. | 429/162 X |
| 3,770,504 | 11/1973 | Bergum | 429/162 X |
| 3,907,599 | 9/1975 | Fanciullo et al. | 429/152 |
| 4,007,472 | 2/1977 | Land | 429/162 X |
| 4,028,479 | 6/1977 | Fanciullo et al. | 429/162 X |

*Primary Examiner*—Anthony Skapars
*Attorney, Agent, or Firm*—John W. Ericson

[57] ABSTRACT

A frame and separator assembly for the manufacture of thin, flat laminar batteries in which the frame has adhesive surfaces to which a separator is adhered. The method of making batteries in which these assemblies are placed over electrode slurries extruded onto conductive plastic substrates and the separators are coated with electrolyte and then contacted with dry patch anodes on conductive plastic substrates to form cells.

4 Claims, 8 Drawing Figures

FLAT BATTERIES AND METHOD OF MAKING THE SAME

This is a division of application Ser. No. 761,652, file Jan. 24, 1977, now abandoned.

This invention relates to primary batteries, and particularly to novel methods and apparatus for constructing thin, flat cells and batteries.

Copending U.S. application for Letters Patent Ser. No. 684,370 was filed on May 7, 1976 by Edwin H. Land for Electrical Cells and Batteries, and is assigned to the assignee of this application. In application Ser. No. 684,370, Leclanche cells are described which include wet slurry cathodes, cellophane separators, and dry patch anodes wet with gel electrolyte. The objects of this invention are to facilitate the construction of thin, flat laminar batteries of the kind described in application Ser. No. 684,370, while effecting improvements in the shelf life and current drain capability of laminar batteries.

Briefly, the above and other objects of the invention are attained by novel methods and apparatus centered about solutions of a problem commonly encountered in the manufacture of thin, flat laminar batteries designed for use without external stress applying members, and to the particular problems involved in the use of cellophane separators in Leclanche cells. The general problem is a tendency to delaminate during storage or use, with the accumulation of thin, gassy layers in the electrically active regions that seriously decrease the available electrical capacity of the battery and increase internal impedance, particularly for high current drain applications where the load impedance is low. The problems specificaly encountered with cellophane separators are that the material is not easily bonded to other materials, and that it swells in contact with the battery electrolyte in a manner destructive to any bond that can be formed. Selective wetting of portions of cellophane separator will cause disruptive wrinkling or curling, as will drying out after wetting.

The invention is organized in part about the discovery that the marginal depression ordinarily produced about the periphery of a laminar battery during sealing causes an oil-canning effect through the stresses induced by permanently deforming the external metal terminal of the battery, usually of steel. Gases usually air, that are included in the void regions of the battery during assembly apparently tend to move toward the central electrode regions in the relief of these stresses. In accordance with the invention, this problem is addressed by the use of battery frames considerably thicker than those commonly employed. For example, in one commercial practice, four cell batteries of a nominal overall thickness of 80 to 100 mils have been made with four frames formed by impregnating the edges of the separators with hot melt adhesive, each frame being about 11 mils in thickness. In accordance with the invention, for this application, frames from 15 to 20 mils in thickness would be preferred. For use with the thick slurry cathode batteries to be described below, even thicker frames, from 18 to 25 mils in thickness, are preferred. These thick peripheral frames greatly reduce the deformation of the end cell steel, and resulting oil canning effect, produced during sealing as described above.

The material for the frames in accordance with the invention should be chosen for its ability to bond weakly to the cellophane separators. In accordance with the invention, the cellophane separators are heat-tacked to the frames and the combination is handled as a subassembly during the manufacture of batteries by the process to be described. After assembly, swelling of the separators destroys the temporary bond to the frames entirely, so that uniform wetting and swelling of the separators takes place. Too good a bond, as might be produced by various conventional cements of thermosetting resins, is definitely desirable because of the differential swelling that would be produced.

The manner in which it is preferred to practice the invention in the manufacture of thin, flat laminar batteries will best be understood in the light of the following detailed description, together with the accompanying drawings, of preferred embodiments thereof.

Figure 1:
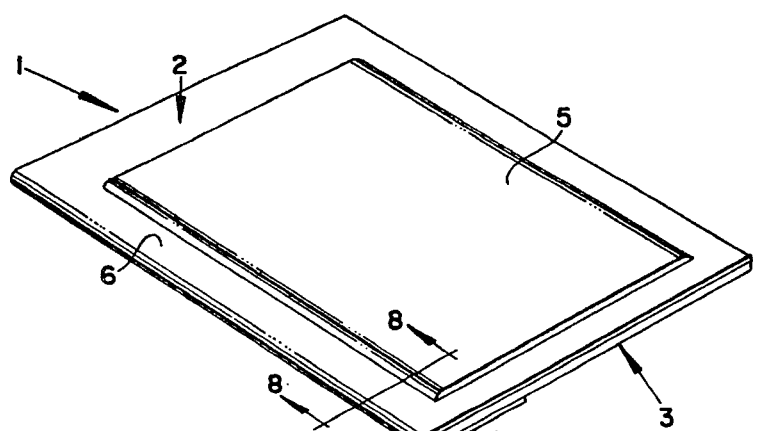
FIG. 1 is a schematic perspective three-quarter sketch of a battery in accordance with the invention, prior to final packaging.

As shown in FIG. 1, a thin, flat battery 1 comprises an outer anode terminal plate 2, of tinned steel, aluminum, or the like, bonded to other components of the battery generally designated 3, and to be described in more detail below, and folded over as indicated at 4 to form a negative terminal in generally the same plane as a positive terminal formed in a manner to be described below.

As indicated, the battery is characterized by a generally raised central region 5 surrounded by a slightly depressed marginal portion 6 effected during the heat sealing of the battery in a manner to be described. In accordance with the invention, the difference in thickness is kept as small as possible, by expedients to be described.

Figure 2:
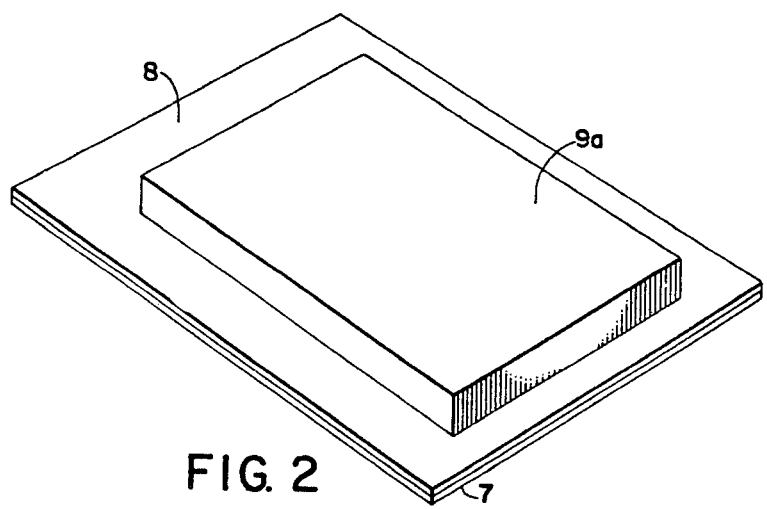
FIG. 2 is a schematic perspective three-quarter view of a cathode current collector and terminal on which there is deposited a layer of cathode mix in an early stage of the assembly of a battery in accordance with the invention.

FIG. 2 shows the end cathode and positive terminal of the battery 1 of FIG. 1 in an early stage of manufacture. Vertical dimensions have been greatly exaggerated with respect to horizontal dimensions to illustrate the relative thicknesses of the internal components of the battery in relatively close proportion to those preferably employed. The negative terminal comprises an outer metal layer 7, of tinned steel, aluminum, or the like, identical in thickness to the negative terminal 2. While various thicknesses may be employed, in practice it is preferred to use sheet metal about 2 mils in thickness where tinned steel is the chosen metal.

Bonded to the metal positive terminal 7 is a sheet of carbon-filled thermoplastic material 8. In the presently preferred practice of the invention, the sheet 8 is made of an electrically conductive carbon-impregnated vinyl film sold by Pervel Industries under the trademark "Condulon", having a thickness on the order of about 2 mils, and including approximately 34 percent of carbon by weight. The carbonaceous layer 8 serves as a current collector and is characterized by being electrochemically inert in the Leclanche cell environment and being essentially impervious to liquid electrolyte.

Deposited within the boundaries of the current collector 8 is a layer of cathode mix 9 containing manganese dioxide, carbon, ammonium chloride, zinc chloride and water in proportions to be discussed below. This layer and other such layers to be described can be deposited on the substrate by silk screening, by extrusion, or by other conventional coating processes. In mass production manufacture, extrusion is preferred. For ease in adapting to a particular extrusion operation, small amounts of binders or dispersants may be added. However, preferably no such binders or dispersants are added to the cathode mix as all such additives degrade the electrical performance of the finished battery at least to some extent. The extremely wet cathode mixes without binders or dispersants which are preferred have exhibited a surprising ability to adhere to the adjacent layers of the battery and to be substantially cohesive.

It is specifically preferred to exclude mercuric chloride from the cathode mix. An adequate amount of mercuric chloride to provide amalgamation of the anode is advantageously included in the gel electrolyte layer on the anode side.

Figure 3:
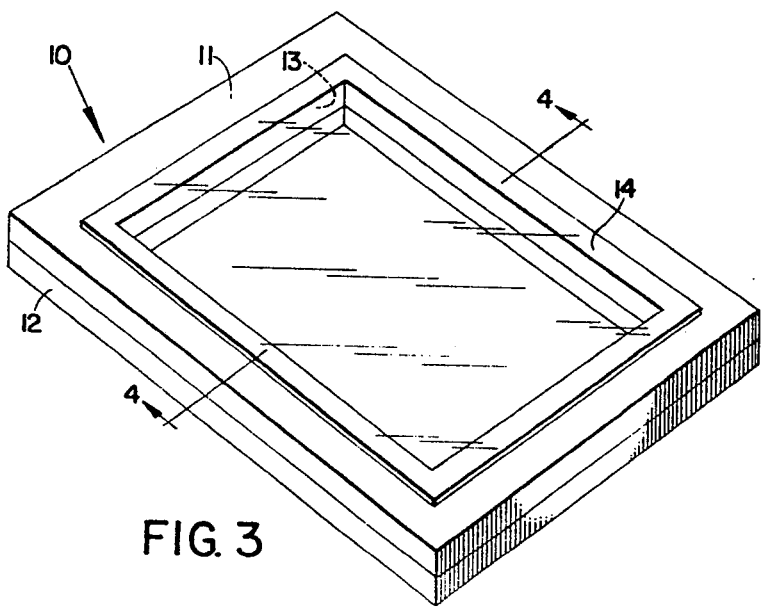
FIG. 3 is a schematic persepective three-quarter view of a separator and frame construction used in batteries in accordance with the invention.

FIG. 3 shows a separator and frame construction adapted to cooperate with the cathode of FIG. 2 in constructing a cell in accordance with the invention. The frame is shown at 10 and may comprise a thin, flat loop made of any suitable liquid impervious insulating material that can be lightly bonded to cellophane. It may be made of a single or double thickness, preferably from 18 to 25 mils in total thickness with the cathode thicknesses to be described. One suitable material for this purpose is Versalon 1140 hot melt adhesive, a polyamide resin made and sold by General Mills, Inc., of Minneapolis, Minnesota. In another construction used successfully, the frame was made of a fibrous nonwoven material, such as that conventionally employed in primary battery separators, filled with Versalon TPX 980, a thermoplastic polyamide resin made and sold by General Mills, Inc., of Minneapolis, Minn. In accordance with the invention in one practical embodiment, two frame elements 11 and 12 each 10 mils in thickness were heat sealed together to form the frame for each cell.

As indicated, a rectangular opening 13 is formed in the frame 10 comprising elements 11 and 12, and over this opening is laid a separator membrane 14, and preferably of regenerated cellulose such as PUD-O cellophane as manufactured and solid by E. I. Du Pont de Nemours & Co. of Wilmington, Del. It is necessary that the cellophane be free of plasticizers and humectants, particularly glycerine or the like, which would destroy it for its intended purpose in the Leclanche cell electrolyte environment. It is also highly desirable that the membrane 12 be quite thin, for example, from 1 to 2 mils in thickness, and in the presently preferred embodiment, 1.34 mils in thickness.

The cellophane separator 14 shown in FIG. 3 is preferably bonded to the frame 10 prior to assembly with the other components. A useful temporary bond for this purpose can be effected between the cellophane 12 and the polyamide surface of the frame element 11 by application of moderate heat under light pressure. After assembly of the battery in the manner described, this bond apparently is destroyed, but it is a useful aid in assembly in the manner to be described.

Four of the frames 10 and separators 14 are required for the manufacture of a four cell battery. These will be designated by the suffixes a, b, c and d in the description to follow.

Figure 4:
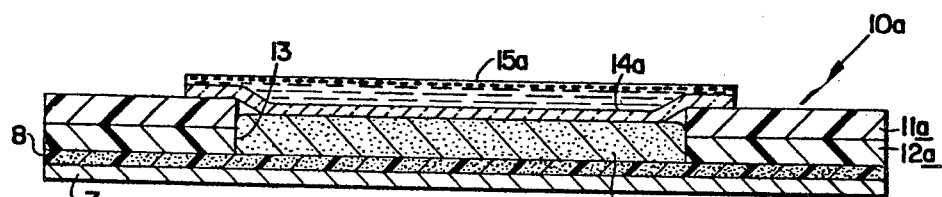
FIG. 4 is a schematic elevational cross-sectional sketch, taken substantially along lines such as 4—4 in FIG. 3, of a portion of a battery in initial stages of manufacture incorporating the structures of FIGS. 2 and 3 with an added layer of electrolyte.

After the extrusion of the cathode slurry layer 9a on the current collector 8 as described above, the first frame 10a with its separator 14a is put in place over the current collector 8 with the slurry layer 9a received in the opening 13 and with the separator 14a in contact with the cathode slurry 9a. A layer of gel electrolyte, of a composition to be described, is then extruded over the separator 14a as shown in FIG. 4. The thickness of the cathode slurry layer may be 10 to 20 mils. As noted, the separator is preferably 1.34 mils initially; this will approximately double as the cellophane swells in the electrolyte solution from the cathode slurry and from the gel electrolyte layer 15a. The gel layer 15a may initially be about 5.4 mils in thickness. The actual dimensional relationships are difficult to illustrate because the horizontal dimensions are so large relative to the vertical dimensions, and because small surface effects are significant on the scale of the vertical dimensions. The basic point is that the thickness of the frames is preferably chosen approximately equal to the combined thicknesses of the components in the central region of the battery so that the overall thickness of the battery will be nearly the same at the edges as in the center.

U.S. Pat. No. 3,563,805, issued on Feb. 16, 1971 to W. H. Deierboi, Jr. for Thin Flat Primary Cells and Batteries shows a framed two cell battery construction which appears to be of uniform thickness. However, internal adhesives are relief on the hold the elements together, and sealing by heat and pressure applied at the marginal portions is described. U.S. Pat. No. 3,488,220, issued on Jan. 6, 1970 to A. E. Lyall et al., shows a rechargeable alkaline cell with molded neoprene sealing rings and of uniform thickness, but relying on thick and rigid outer carrier plates to prevent bridging. Batteries of the kind with which this invention is concerned have considerably thinner and more flexible components, and are subject to substantial marginal compression during sealing unless specific steps are taken to avoid it.

In this regard, the battery made and sold as a component of the familiar Polaroid SX-70 Land film pack is normally thought of as planar; it is thin and flat in overall appearance and is so shown and described in various patents concerned with modifications or adaptions of the battery, such as U.S. Pat. Nos. 3,877,045, issued on Apr. 8, 1975 to Stanley M. Bloom et al., and 3,899,355, issued on Aug. 12, 1975 to Charles K. Chiklis, for example. On close inspection of the actual battery, however, preferably with a micrometer, it will be seen that as currently made there is a measurable difference of something like fifty percent between the edge thickness and the central thickness.

Figure 5:
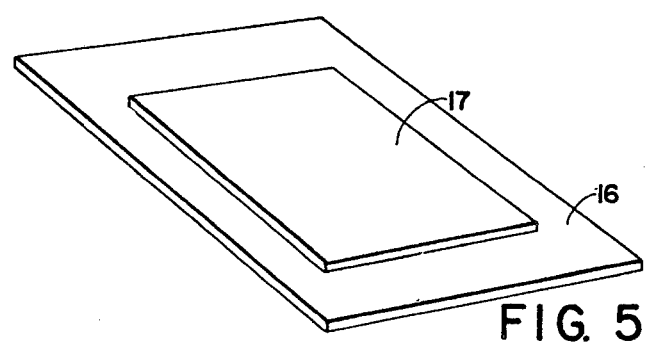
FIG. 5 is a schematic perspective sketch of an anode and intercell connector comprising a component of a battery in accordance with the invention.

FIG. 5 shows a combined anode and intercell connector subassembly, one of which is the component next to be added to the assembly of FIG. 4. This subassembly comprises a sheet 16 of conductive plastic that may be of the same material and thickness as the cathode collector sheet 8 described above. On the intercell connector sheet 16 is deposited, preferably by extrusion, a zinc anode patch 17 of a composition to be described below. The anode patch 17 includes binders and is dried before it is installed in the battery. Three of these subassemblies, identified by suffixes a, b and c below, are employed in the four cell batteries to be described.

Figure 6:
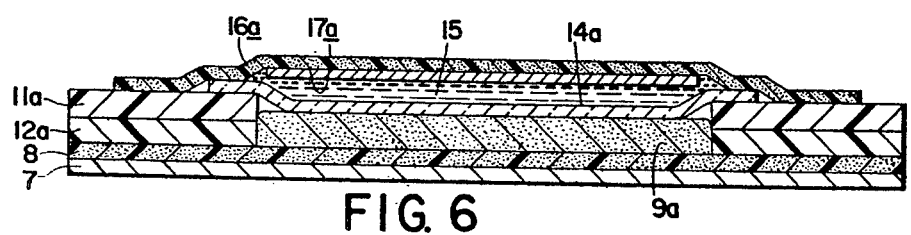
FIG. 6 is a schematic elevational sketch similar to FIG. 4 and showing a partially completed battery in a later stage of manufacture.

As shown in FIG. 6, a first of the subassemblies of FIG. 5, comprising an intercell connector 16a and an anode patch 17a, is put in place over the frame element 11a with the anode 17a in contact with the gel electrolyte layer 15a. The intercell connector 16a preferably extends well beyond the boundaries of the wet separator 14a to allow a later thermal bond to be effected between the intercell connector 16a and adjacent frame elements, but within the boundaries of the frames to prevent intercell short circuits.

Figure 7:
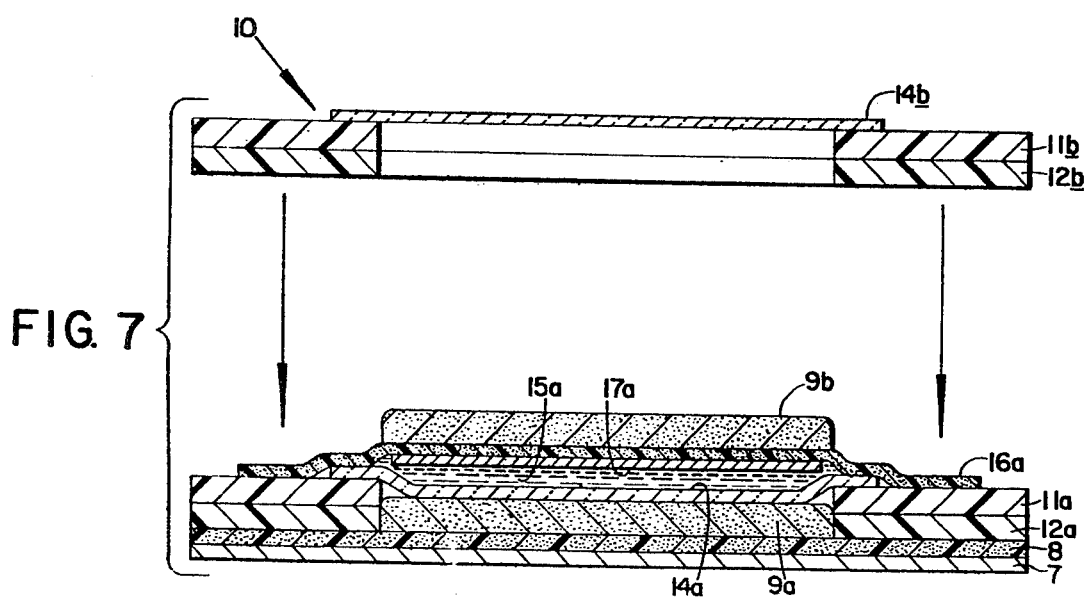
FIG. 7 is an exploded schematic cross-sectional elevational sketch similar to FIGS. 4 and 7 illustrating a partially assembled battery in the process of receiving a framed separator in accordance with the invention.

The next steps in the assembly of the battery are the extrusion of a second cathode slurry layer 9b over the intercell connector 16a, followed by the placement of the second frame 10b with its pre-attached separator 14b as suggested in FIG. 7. Thereafter, the separator 14b is coated with gel electrolyte and another intercell connector and anode subassmbly is added. The process is continued in this fashion until a fourth cathode slurry 9d has been extruded over the third intercell connector 16c. The result, after completion in a manner to be described, is as illustrated in FIG. 8.

Figure 8:
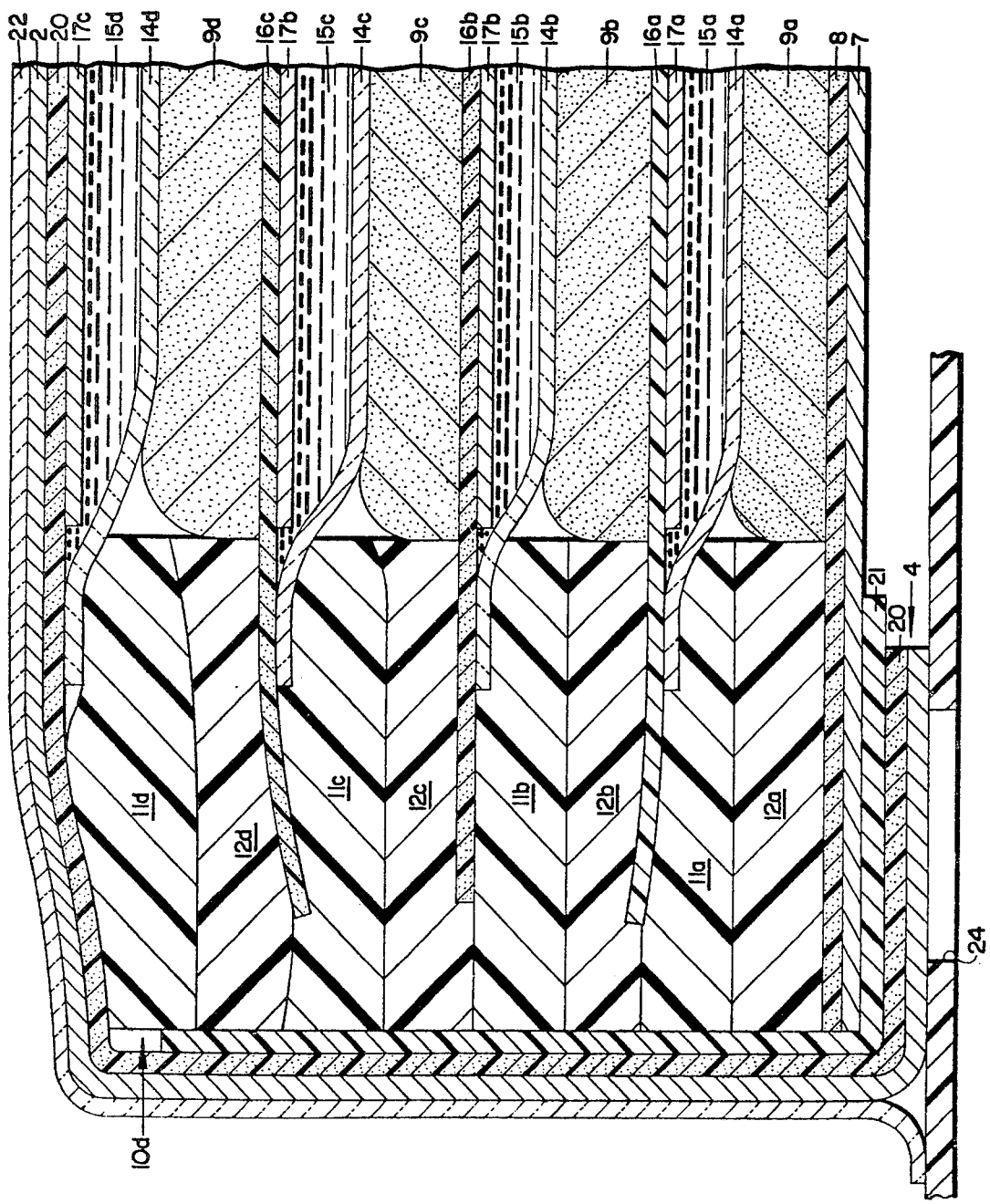
FIG. 8 is a fragmentary schematic cross-section elevational sketch, on an enlarged scale, of a portion of a completed battery as seen essentially along the lines 8—8 in FIG. 1.

Referring to FIG. 8, there is shown a completed battery of the type shown in FIG. 1, including an external semi-permeable wrapper and a cardboard base as utilized in commercial practice.

After the last of the anode slurry layers 9d is extruded over the third intercell connector 16c, the uppermost frame 10d, comprising the heat-sealed elements 11d and 12b, with its pre-attached separator 14d is put in position. An anode terminal assembly is next put in place.

Referring to FIG. 8, the anode terminal assembly comprises the steel or aluminum terminal sheet 2 described above. To this terminal sheet is prelaminated a conductive plastic anode collector sheet 20, which may be 2 mils in thickness and of the same material as the cathode collector 8 and the intercell connector 16. An anode patch 17c is formed on the collector 20 in the manner described above, of the same size, weight and composition as the other anode patches 17 described above.

After coating the separator 14d with a layer of gel electrolyte 15d, the anode terminal assembly just described, initially in flat form, is placed over the frame 11d with the anode patch 17d in contact with the gel electrolyte 15d. The assembly is then sealed with heat and pressure, preferably in the manner described in copending U.S. application for Letters Patent Ser. No. 761,650, filed concurrently herewith by Gordon F. Kinsman for Method for Sealing Battery and assigned to the assignee of this application. As more fully described therein, the battery frames and projecting regions of the intercell connectors are preferably heat sealed together under a pressure that is at least as great, or greater, in the center of the battery as at the edges, so that peripheral reductions in thickness are minimized. The use of thick frames for the purposes and in the manner herein described contributes materially to the ease of avoiding deformation of the end steel 2 during sealing in this manner.

After the battery has been sealed in the manner just described, an insulating sheet 21 of, for example, 2 mil polyethylene, is inserted between the steel cathode terminal 7 and the carbon-filled plastic anode current collector 20 to insulate the cathode terminal from the anode terminal, and the end portion of the anode terminal assembly 4 is folded around to make the negative terminal assembly in substantially the same plane as the positive terminal. Next, a liquid impervious, gas permeable outer covering 22, of polyethylene, polyvinyl chloride, or the like, for example, about 1 mil in thickness, is wrapped over the battery so assembled and adhered by any suitable bonding mechanism to a cardboard base place 23. Apertures such as 24 through the cardboard base plate 23 serve to admit contacts to the terminals such as 4 of the battery for connection to external apparatus.

Batteries in accordance with the preferred embodiment were made as described in the following example.

EXAMPLE I

A cathode mix was made with the following composition, in which quantities are given both in weight percent, based on the total weight of materials, and in grams.

|  | Wt. % | Grams |
|---|---|---|
| MnO$_2$ | 51.81 | 200 |
| Shawinegan Black | 6.48 | 25 |
| H$_2$O | 27.80 | 107.3 |
| NH$_4$Cl | 9.56 | 36.9 |
| ZnCl$_2$ | 4.35 | 16.8 |

The Shawinegan Black is a highly structured carbon black in the "100% compressed" form, as made and sold by Shawinegan Products Corp., N.Y.,N.Y. The ammonium chloride and zinc chloride were dissolved in the water. The manganese dioxide and carbon were blended together, then mixed into 141 grams of the electrolyte solution and stirred until thoroughly dispersed. The balance, 20 grams, of the electrolyte was added as convenient to temporarily reduce the viscosity of the mix, and thereby assist in blending, as maximum viscosity was approached. Blending was continued until a homogeneous, highly viscous and cohesive mass was obtained.

The cathode mix made as just described was coated on 2 mil Condulon sheets 2.75 inches by 3.42 inches to a depth of 25 mils, over a central area about 2½ inches by 1⅜ inches; the weight of mix per cathode was 3.5–4.0 grams.

The anode patches were made from the following composition, in which composition is expressed in parts by weight, in accordance with the presently preferred practice of the invention;

| Zinc powder | 1,000 |
|---|---|
| H$_2$O | 149.2 |
| Benton LT Dispersant | .61 |
| Tetrasodium pyrophosphate | 125 |
| Shawinegan Black | 5 |
| Polytex 6510 Latex | 39.05 |

In the above composition, Polytex 6510 is an acrylic emulsion resin made and sold by Celanese Corp., of Newark, N.J. Benton LT is an organic derivative of hydrous magnesium aluminum silicate, as made and solid by National Lead Co., Inc. of N.Y., N.Y.

The composition was laid down on the carbonaceous sheet in the manner described above, and then heated to dryness to form a dry patch of an area about 2½ by 1⅞ inches and from 1½ to 2 mils in thickness. On the intercell connectors this operation was performed before the cathode mix was deposited.

The gel electrolyte employed in the batteries to be described had the following composition, expressed as parts by weight:

| | |
|---|---|
| NH$_4$Cl | 21.8 |
| ZnCl$_2$ | 9.9 |
| HgCl$_2$ | 1.9 |
| H$_2$O | 63.5 |
| Natrosol 250 HHR | 2.9 |

Natrosol 250 HHR is hydroxyethyl cellulose, sold by Hercules, Inc. of Wilmington, Del.

This composition was coated over the cellophane separator to a thickness of 5.4 mils.

Five four-cell batteries, identified as IA through IE below, were made as described above. Open circuit voltages OCV, and closed circuit voltages measured with a 3 ohm load for 0.1 seconds, were determined after four days and are given below:

| Battery | OCV | CCV |
|---|---|---|
| IA | 6.77 | 6.28 |
| IB | 6.74 | 6.23 |
| IC | 6.76 | 6.27 |
| ID | 6.79 | 6.31 |
| IE | 6.79 | 6.33 |
| Average | 6.77 | 6.28 |

Batteries made in accordance with the preferred embodiment of the invention except that various binders of dispersants are included exhibit many of the advantages of the invention, but are less effective under conditions of high current drain, as for the rapid recharge of an electronic flash unit. Illustrative of such batteries are those described in Examples II and III below.

EXAMPLE II

Six four-cell batteries were made exactly as described in Example I, above except that 2.9 percent by weight of BP-100, a latex made and sold by Exxon Chemical Co. of Houston, Tex., was included in the cathode mix. These batteries, identified below as IIA through IIF, were measured in the manner described above after four days, with the following results.

| Battery | OCV | CCV |
|---|---|---|
| IIA | 6.63 | 6.07 |
| IIB | 6.63 | 6.06 |
| IIC | 6.72 | 6.09 |
| IID | 6.68 | 6.08 |
| IIE | 6.69 | 6.06 |
| IIF | 6.58 | 5.93 |
| Average | 6.66 | 6.05 |

EXAMPLE III

Five four-cell batteries were made exactly as described in Example I, above, except that 1.52 percent by weight of 2-acrylamido-2-methylpropane sulfonic acid was included in the cathode mix. These batteries, identified below as IIIA through IIIE, were measured in the manner described above after 4 days, with the following results:

| Battery | OCV | CCV |
|---|---|---|
| IIIA | 6.72 | 5.67 |
| IIIB | 6.69 | 5.67 |
| IIIC | 6.68 | 5.73 |
| IIID | 6.70 | 5.69 |
| IIIE | 6.68 | 5.57 |
| Average | 6.69 | 5.67 |

While the invention has been described with respect to the details of various illustrative embodiments, many changes and variations will be apparent to those skilled in the art upon reading this description, and such can be made without departing from the scope of the invention.

Having thus described the invention, what is claimed is:

1. In a thin, flat laminar battery, a subassembly comprising a frame of liquid impervious insulating material at least the exterior surfaces of which comprise a thermoplastic hot melt adhesive material, means forming an opening within the periphery of said frame adapted to receive the components of an electrical cell, a cellophane separator wet with electrolyte on one surface of said frame covering said opening, a layer of gel electrolyte on said cellophane separator, a conductive plastic intercell connector over said cellophane separator and projecting beyond the boundaries thereof on all sides and thermally sealed to said frame, said intercell connector being within the boundaries of said frame, and a laminar zinc anode patch on said intercell connector in a region in registry with said opening and in contact with said gel electrolyte.

2. The assembly of claim 1, in which said frame comprises two congruent laminae heat sealed together.

3. The assembly of claim 1, in which said frame comprises a thin, flat monolithic loop of hot melt adhesive material.

4. The assembly of claim 2, in which said laminae each comprises a thin, flat loop of non-woven fibrous separator material filled with hot melt thermoplastic adhesive.

* * * * *